United States Patent [19]

Armstrong

[11] Patent Number: 4,659,044

[45] Date of Patent: Apr. 21, 1987

[54] UNIVERSAL KIT FOR SPAR-MOUNTED MOUNT FOR RADAR ANTENNA

[76] Inventor: Douglas C. Armstrong, 6348 S. 20 St., Milwaukee, Wis. 53221

[21] Appl. No.: 781,066

[22] Filed: Sep. 26, 1985

[51] Int. Cl.⁴ .......................................... F16M 13/00
[52] U.S. Cl. .................... 248/218.4; 114/90; 114/343; 248/247; 343/880
[58] Field of Search ............. 248/218.4, 219.4, 674, 248/675, 219.3, 235, 241, 247, 916, 678, 188.2; 182/90, 187; 114/343, 90; 343/709, 710, 880, 881

[56] References Cited

U.S. PATENT DOCUMENTS

| | | | |
|---|---|---|---|
| 1,663,151 | 3/1928 | Armstrong | 248/247 |
| 1,714,814 | 5/1929 | Plimpton | 248/219.3 X |
| 2,414,078 | 1/1947 | Wetzel | 248/235 X |
| 2,631,076 | 3/1953 | Redlich | 248/230 X |
| 2,846,570 | 8/1958 | Harling | 248/219.3 X |
| 3,083,796 | 4/1963 | Bell, Jr. | 411/546 X |
| 3,778,013 | 12/1973 | Selenke | 248/219.4 |
| 3,801,731 | 4/1974 | Hansen | 248/230 X |
| 3,921,949 | 11/1975 | Coon | 248/230 X |
| 4,061,301 | 12/1977 | Catena | 248/230 X |
| 4,300,739 | 11/1981 | Sande | 248/219.4 |
| 4,313,587 | 2/1982 | Loeschen | 248/235 X |

Primary Examiner—J. Franklin Foss
Assistant Examiner—David L. Talbott
Attorney, Agent, or Firm—Quarles & Brady

[57] ABSTRACT

A kit (1) for assembling into a mount (20) for attachment to a spar (21) to support a radar antenna (26) including port and starboard side plates (2), a base plate (3), a plurality of compression tubes (4) and a plurality of threaded fasteners (5). The mount assembled from the kit has the base plate attached to the port and starboard side plates, the side plates attached to the spar, and the compression tubes fastened between the side plates by the threaded fasteners to thereby form a rigid structure capable of supporting a radar antenna.

4 Claims, 4 Drawing Figures

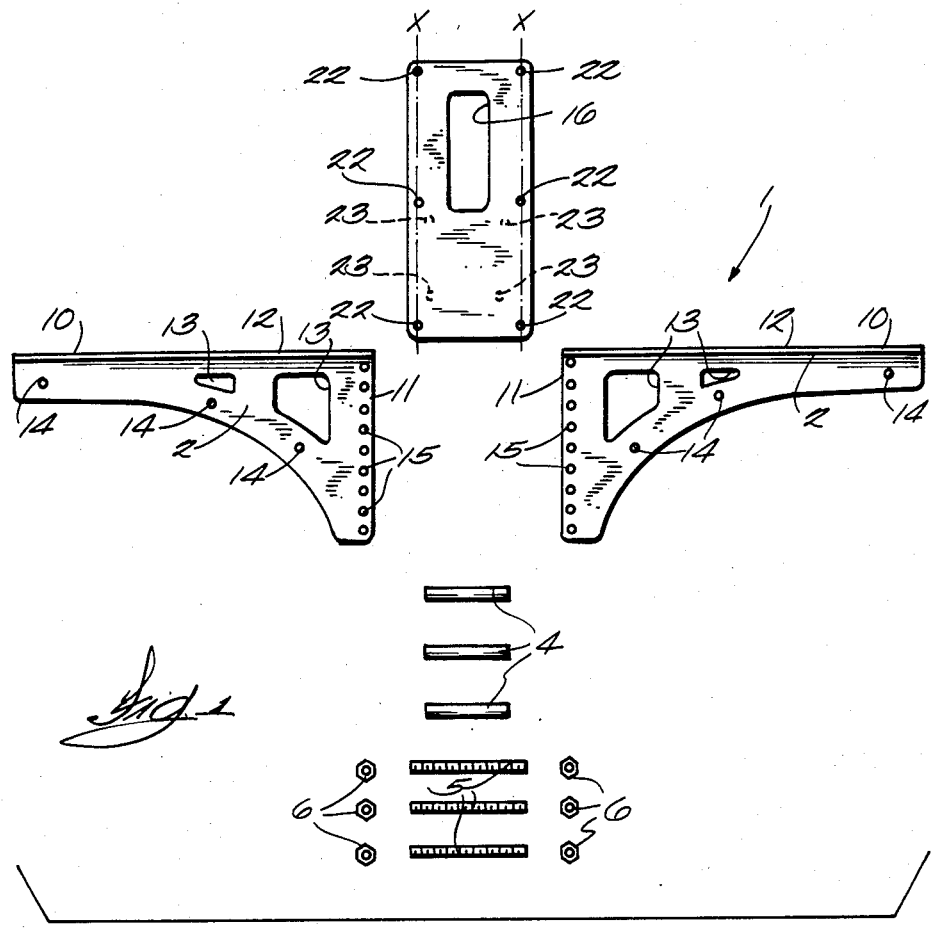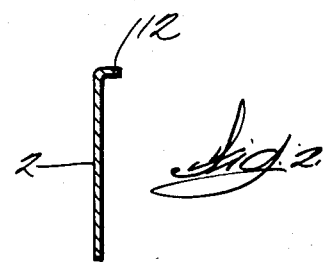

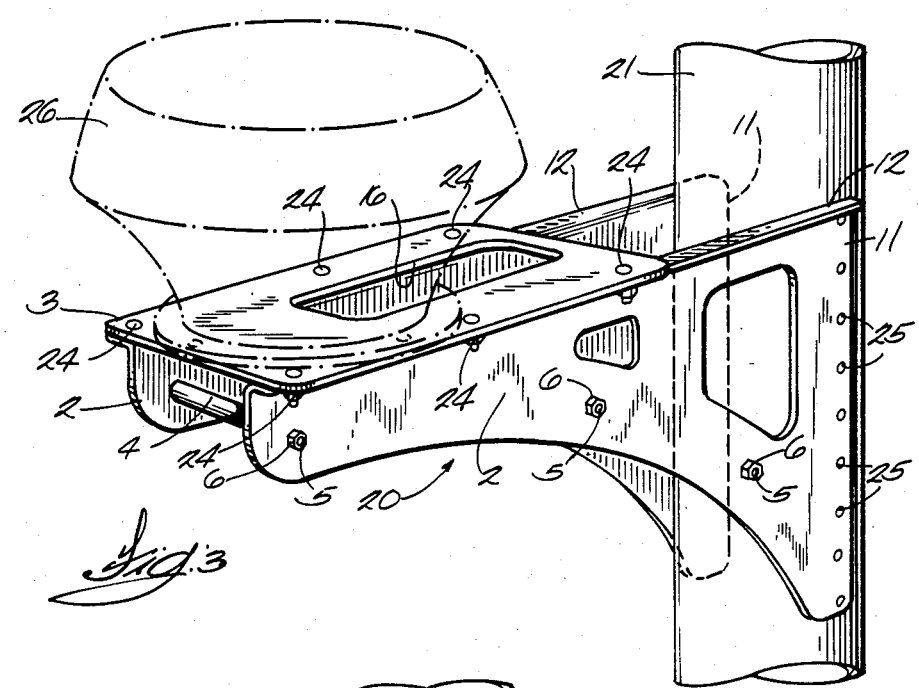
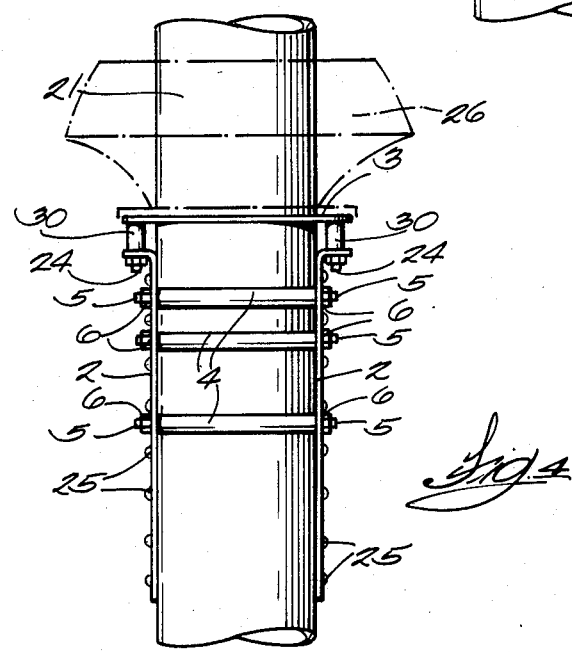

UNIVERSAL KIT FOR SPAR-MOUNTED MOUNT FOR RADAR ANTENNA

FIELD

This invention relates generally to the nautical engineering art, more specifically to equipment for mounting a radar antenna on a vertical spar such as on a sailboat or powerboat.

BACKGROUND

Many pleasure boaters, both sail and power, have recently become extremely interested in carrying a radar on their boats. The present relative affordability of radar sets suitable for pleasure boats has made them a viable accessory for use as a navigation tool and for the inherent safety of being able to identify shore features such as a harbor or boat traffic on the water at times of low or reduced visibility such as a nighttime, fog, haze, etc. Therefore many owners of sailboats and power boats are desirous of installing a radar.

All radar units include a rotating antenna that is attached to a base. The rotating antenna is generally covered with a random when installed on a sailboat so as not to interfere with halyards and other lines, and the antenna may be left uncovered for installation on a powerboat where this is not a problem. The antenna assembly must be mounted as high as possible on a boat in order to obtain good range with the unit. For sailboats and many powerboats, this necessitates that the antenna be carried on a vertical spar, such as on a mast on a sailboat or a spar used for a flag hoist or a steadying sail on a powerboat. This in turn requires some type of support that can be attached to a spar and which will be adapted to mount a radar antenna. So far as I am aware, the prior art mounts for such purpose most generally have been custom-made for each boat or radar antenna and often have been one piece units of cast or welded construction. This is unsatisfactory as it results in a significant expense to the boat owner to have a special mount made for his/her particular boat, and also presents problems for a boatyard that may be asked to fabricate or install a mount.

My present invention was developed in response to the need for a kit for attaching to a spar to provide a mount for a radar antenna. I have designed and tested a kit for spar mounted radar antenna mount that can be attached to spars of varying widths, so as to thereby provide a universal kit suitable for many sizes of spars and adapted to mount numerous models of radar antennas.

SUMMARY OF THE INVENTION

The present invention provides a kit for a spar-mounted radar mount comprising (1) a pair of side plates that are to be attached to a spar, (2) a base plate that is to be attached to the side plates, (3) compression tubes that are to be cut to a length equal to the width of a spar on which the side plates are to be attached, and (4) threaded fasteners that are to extend through the compression tubes and be secured to the side plates to form a rigid structure. As an optional element, the kit may include vertical spacer tubes to raise the base plate above the side plates.

DESCRIPTION OF THE DRAWINGS

The present invention is fully and completely described herein by reference to the accompanying drawings, in which:

FIG. 1 is a plan view illustrating the several elements in a kit of this invention;

FIG. 2 is a vertical sectional view of a side plate element of the kit of FIG. 1;

FIG. 3 is a perspective view of a mount assembled from the kit of FIG. 1 attached to a spar; and FIG. 4 is a front view of a second form of mount assembled from a kit according to this invention.

DESCRIPTION OF PREFERRED EMBODIMENTS

FIG. 1 illustrates a kit 1 according to the present invention comprising port and staboard side plates 2, both plates being of the same construction; a base plate 3; a plurality of compression tubes 4, three such tubes being shown in the exemplary embodiment; and threaded fasteners 5, there being one such fastener for each compression tube. Threaded nuts 6 may also be supplied in the kit, two such nuts for each threaded fastener 5.

Each side plate 2 is a generally L-shaped element in the form of a vertical web including a horizontal leg 10 and a vertical leg 11. An outward-turned flange 12 extends along the horizontal leg of each plate as best shown in cross-section in FIG. 2. Lightening holes 13 may be formed in the side plates as shown in order to reduce the weight of each plate. Three spaced connector holes 14 are formed along the lower portion of the web of each side plate, each hole 14 in one side plate being aligned with a hole 14 in the other side plate. Mounting holes 15 are formed in a vertical row along the vertical leg 11 of each side plate.

The base plate 3 is illustrated as a rectangular element in the drawings, but it may also be a square or circular element if so desired. The base plate includes an aperture 16 cut out of its central portion through which a connector cable can extend from a radar antenna to a radar screen in the boat.

The compression tubes 4 are hollow tubular elements. As described below, the compression tubes are to be cut to a length equal to the width of a specific spar when the kit is assembled into a mount for attachment to the spar. Therefore, the compression tubes as supplied in the kit 1 are to be long enough to accommodate a wide range of spar widths.

The threaded fasteners 5 are to extend through a connector hole 14 in the starboard side plate 2, through a connector compression tube and then through a hole 14 in the port side plate 2 that is aligned with a connector hole of the starboard side plate. The fasteners 5 are shown as threaded rods in the exemplary embodiment, but other fastening means can be used such as threaded bolts.

The elements of the kit 1 are preferably made of metal in order to have the appropriate strength characteristics, and most desirably aluminum, vinyl coated aluminum or stainless steel.

A mount 20 assembled from the kit 1 is illustrated in FIG. 3 attached to a vertical spar 21, which can be a mast on a sailboat or a spar on a powerboat. Installation of the kit on the spar is very simple and can be accomplished by a boat owner or by a boatyard professional according to the following procedure.

(1) The first step is to measure the width of the specific spar (SW) to which the kit is to be attached. The fore and aft centerline of the base plate 3 is marked, and then a line X is marked on each side of the base plate (see FIG. 1) a distance equal to one-half SW plus, preferably, one-half the width of a flange 12 of the side plates. Holes 22, shown in FIG. 1, are drilled through the base plate along each line X.

(2) The hole pattern of the base of the radar antenna to be attached to the mount is laid out on the base plate 3 and holes 23 drilled through the base plate at the appropriate location so that the antenna base can be bolted to the base plate 3 after the mount is installed on the spar. The holes 23 are shown in dashed line in FIG. 1 as representative of a hole pattern, bearing in mind that the pattern will vary for each different brand of radar.

(3) Holes are drilled through the flange 12 of each side plate 2, there being a hole in each flange in alignment with each hole 22 drilled through the base plate. The base plate 3 is then bolted to the port and starboard side plate by suitable bolts 24 extending through a hole 22 and an aligned hole through the flange of a side plate.

(4) Next, each compression tube 4 is cut to a length equal to the width of the spar (SW) making sure that the ends of the tubes are cut square. The threaded fasteners 5 are cut to a length SW plus about one inch. The compression tubes are positioned between the side plates 2, each tube being registered with a pair of aligned holes 14 of each side plate, and a threaded fastener 5 is placed through a compression tube so as to have an end extending outboard of each side plate through a hole 14, after which a nut 6 is threaded onto each end of a fastener 5. The nuts are preferably not tightened completely at this point of the installation.

(5) The assembled mount 20 is then located on the spar 21, usually extending from the front of the spar, at the desired height with the mounting holes 15 of the side plates located at the widest part of the spar. The mounting hole location is then marked on the spar, and holes are drilled through the spar and tapped to receive screws 25 that are used to attach each side plate to the spar. The screws 25 can be supplied with the kit 1 or furnished by the installer. At this stage, it is easier to first mark, drill and tap the top and bottom mounting holes in the spar for each side plate and then do the same for the rest of the mounting holes after the mount is temporarily attached in place. After screws 25 have been attached to the spar through all of the mounting holes 15, the threaded fasteners 5 are tightened firmly to complete assembly of the mount 20 and its attachment to the spar 21. It has been found that the compression tubes are an essential element of the kit because they provide a rigid mount structure when assembly is completed. A radar antenna 26, shown in dashed line in FIG. 3, is then attached to the base plate 3, with its connector cable (not shown) extending through the aperture 16 thereof and then extending either inside or outside the spar 21 for connection to the radar unit in the boat.

The hole spacing on the base of some radar antennas is such that when the base plate 3 is drilled with holes 23 to match the hole pattern of the antenna base, the holes 23 will sometimes be just above a side plate 2 if the spar width SW should be equal or close to the width between the holes. To accommodate this situation, turning now to FIG. 4, the kit 1 can include a set of vertical spacer tubes 30 that can be connected between the base plate 3 and the side plates 2 so as to raise the base plate about one half to one inch or so above the side plates and allow room to bolt the base of the antenna onto the base plate. The spacer tubes thus allow the mounting bolts for the radar antenna to fit above the vertical plane of the side plates when required for a specific antenna.

In a specific example of a kit according to this invention, the kit included port and starboard side plates about 16 inches high by 28 inches long with a flange about 1-¼ inch wide and a base plate about 10-½ inches by 15-¾ inches. Three compression tubes each eight inches long, consisting of tubing with a 9/16 inch OD were included with the kit, together with threaded rods that were 9 inches long by 5/16 inch in diameter. The side plates and compression tubes were made of aluminum about ⅛ inch thick that was coated with vinyl and the base plate was made of 3/16 inch thick vinyl coated aluminum. It has been found that a kit including elements as described can be attached to spars of many different sizes and can accommodate the antenna of all brands of radars currently being marketed for use with pleasure boats. Also, it has been found that a mount assembled from the kit is capable of withstanding the stresses developed by the pitching, yawing and heeling motions experienced by a boat at sea.

There has thus been described a kit for a spar-mounted radar mount which can be used to eliminate the need for a custom-made mount for a radar antenna and which can be economically installed onto a spar of either a powerboat or a sailboat, thereby offering the potential of further increasing the use of radar units by pleasure boats.

I claim:

1. A kit for assembling a mount for a radar antenna, the mount to be attached to a spar on a sailboat or powerboat, comprising in combination:
   (1) a base plate for supporting a radar antenna;
   (2) port and starboard side plates, each side plate including a horizontal leg and a vertical leg, a flange extending along the horizontal leg, a plurality of mounting holes defined along the vertical leg, and a plurality of connector holes defined along each side plate arranged in pairs with a connector hole in the starboard side plate aligned with a connector hole in the port side plate;
   (3) a plurality of compression tubes, there being one compression tube for each pair of connector holes in the port and starboard side plates; and
   (4) a plurality of threaded fasteners, there being one threaded fastener for each compression tube, the kit being adapted for assembling a mount to be attached to a spar along the mounting holes of the side plates with the base plate attached to the flanges of the side plates and with the compression tubes fastened between the side plates by the threaded fasteners extending through the connector holes of the side plates and the compression tubes, the compression tubes being adjusted to a length equal to the width of a spar.

2. A kit according to claim 1, wherein:
   each side plate further comprises a vertical web and the flange extends outwardly from the horizontal leg thereof.

3. A kit according to claim 1 further including:
   a plurality of vertical spacer tubes for positioning between the base plate and the flange of each side plate to raise the base plate above the side plates when a mount is assembled from the kit.
4. A kit according to claim 2 further including:
a plurality of vertical spacer tubes for positioning between the base plate and the flange of each side plate to raise the base plate above the side plates when a mount is assembled from the kit.

* * * * *